(12) United States Patent
Ishikawa

(10) Patent No.: US 6,925,310 B2
(45) Date of Patent: Aug. 2, 2005

(54) POWER CALCULATION METHOD OF A RADIO COMMUNICATION SYSTEM AND AN APPARATUS THEREFOR

(75) Inventor: Yoshihiro Ishikawa, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 453 days.

(21) Appl. No.: 10/091,457

(22) Filed: Mar. 7, 2002

(65) Prior Publication Data

US 2002/0160803 A1 Oct. 31, 2002

(30) Foreign Application Priority Data

Mar. 7, 2001 (JP) ........................................ 2001-064140

(51) Int. Cl.[7] .............................. H04B 7/00; H04Q 7/20
(52) U.S. Cl. ........................ 455/522; 455/571; 455/572; 455/69; 455/13.4
(58) Field of Search ................................ 455/522, 571, 455/572, 573, 574, 69, 13.4; 370/318, 335

(56) References Cited

U.S. PATENT DOCUMENTS

| | | | |
|---|---|---|---|
| 5,539,728 A | * 7/1996 | Gaiani et al. | 370/342 |
| 5,842,114 A | 11/1998 | Ozluturk | |
| 6,393,005 B1 | * 5/2002 | Mimura | 370/335 |
| 6,643,521 B1 | * 11/2003 | Bourgoin et al. | 455/522 |
| 6,754,475 B1 | * 6/2004 | Harrison et al. | 455/115.1 |
| 2002/0021682 A1 | * 2/2002 | Ariyoshi et al. | 370/335 |

FOREIGN PATENT DOCUMENTS

EP          1 063 788          12/2000

OTHER PUBLICATIONS

Y. Ishikawa, et al., The Institute of Electronics, Information and Communication Engineers, B–5–8, p. 261, "Forward Radio Link Design for DS–CDMA Cellular Systems", 1997.

T. Hayashi, et al., The Institute of Electronics, Information and Communication Engineers, B–5–81, p. 466, "a Study of Transmission Power Allocation in Downlink Common Control Channels in W–CDMA System", 2000.

M. Hata, IEEE Transactions on Vehicular Technology, vol. VT–29, No. 3, pp. 317–325, "Empirical Formula for Propagation Loss in Land Mobile Radio Services", Aug. 1980.

* cited by examiner

*Primary Examiner*—Nick Corsaro
*Assistant Examiner*—Shaima Q. Aminzay
(74) *Attorney, Agent, or Firm*—Oblon, Spivak, McClelland, Maier & Neustadt, P.C.

(57) ABSTRACT

A conventional link budget technique has not been fully applicable to a link design of a downlink in CDMA systems, which is now available by using both a power level of a radio channel in question and a total power level, which can be further refined by considering an orthogonality factor and an interference coefficient due to other base stations.

12 Claims, 4 Drawing Sheets

FIG.2

| | DEFINITION | CCPCH |
|---|---|---|
| (a) MAXIMUM TOTAL TRANSMISSION POWER OF BASE STATION (dBm) | | 42.00 |
| (b) TRANSMISSION POWER OF DESIGN TARGET CHANNEL (dBm) | | 36.00 |
| (b1) POWER RATIO OF DESIGN TARGET CHANNEL (%) | $10^{(b)/10} / 10^{(a)/10} \times 100$ | 25.12 |
| (c) TRANSMITTER FEEDER LOSS (dB) | | 3.00 |
| (d) TRANSMITTER ANTENNA GAIN (dB) | | 17.00 |
| (e) EFFECTIVE TOTAL RADIATION POWER (dBm) | (a)−(c)+(d) | 56.00 |
| (f) EFFECTIVE RADIATION POWER OF DESIGN TARGET CHANNEL (dBm) | (b)−(c)+(d) | 50.00 |
| (g) RECEIVER ANTENNA GAIN (dB) | | 0.00 |
| (h) RECEIVER FEEDER LOSS (dB) | | 0.00 |
| (i) THERMAL NOISE POWER DENSITY (dBm/Hz) | | −174.00 |
| (j) RECEIVER NOISE FIGURE NF (dB) | | 5.00 |
| (k) SYMBOL RATE (ksps) | | 15.00 |
| (l) SYMBOL RATE (dBHz) | $10*LOG((k)*1000)$ | 41.76 |
| (m) THERMAL NOISE POWER (dBm) | (i)+(j)+(l) | −127.24 |
| (n) CHIP RATE (Mcps) | | 3.84 |
| (o) COEFFICIENT OF INTERFERENCE FROM OTHER CELLS (dB) | | 8.00 |
| (p) REQUIRED SIGNAL TO INTERFERENCE POWER Λ(dB) | | 7.00 |
| (q) ORTHOGONALITY COEFFICIENT | $\dfrac{10^{(p)/10} \cdot 10^{(p)/10}}{1 - \dfrac{(k) \cdot 10^3 \cdot 10^{(p)/10}}{(n) \cdot 10^6 \cdot (b1)/100} \cdot \left((q) + 10^{(o)/10}\right)}$ | 0.50 |
| (r) REQUIRED RECEIVING POWER (dBm) | | −116.95 |
| (s) DHO GAIN (dB) | | 0.00 |
| (t) SHADOWING MARGIN (dB) | | 5.30 |
| (u) FLUCTUATION MARGIN OF HIGH-SPEED TRANSMISSION POWER CONTROL (dB) | | 0.00 |
| (v) BUILDING PENETRATION LOSS (dB) | | 6.00 |
| (w) A ANTENNA BEAM TILT COMPENSATION (dB) | | 0.00 |
| (x) ALLOWABLE PROPAGATION LOSS(dB) | (f)−(r)+(g)−(h)+(s)−(t)−(u)−(v) | 155.65 |
| (y) RANGE (km) | ACCORDING TO REFERENCE 3, ETC. | 4.12 |

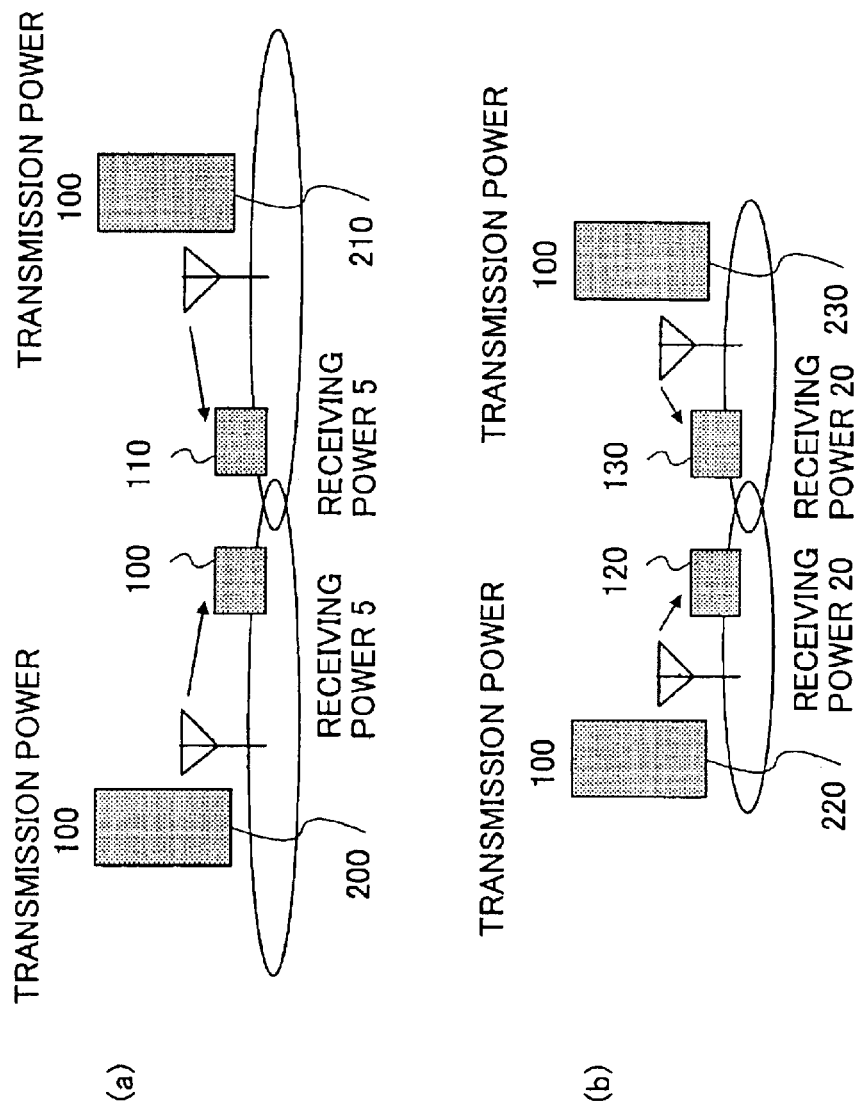

FIG.4

| SERVICE | ① 12.2k-Speech | ② 64kbps | ③ 384kbps |
|---|---|---|---|
| (a) MAXIMUM TOTAL TRANSMISSION POWER OF BASE STATION (dBm) | 21.00 | 24.00 | -24.00 |
| (b) TRANSMISSION FEEDER LOSS (dB) | 0.00 | 0.00 | 0.00 |
| (c) TRANSMITTER ANTENA GAIN (dBi) | 0.00 | 0.00 | 0.00 |
| (d) TRANSMISSION EFFECTIVE RADIATION POWER=a-b+c (dBm) | 21.00 | 24.00 | 24.00 |
| (e) RECEIVER ANTENNA GAIN (dBi) | 17.00 | 17.00 | 17.00 |
| (f) RECEIVER FEEDER LOSS (dB) | 1.00 | 1.00 | 1.00 |
| (g) RECEIVER NOISE FACTOR NF (dB) | 5.00 | 5.00 | 5.00 |
| (h) THERMAL NOISE POWER DENSITY (dBm/Hz) | -174.00 | -174.00 | -174.00 |
| (i) INTERFERENCE MARGIN (dB) | 6.00 | 6.00 | 6.00 |
| (j) TOTAL NOISE (INTERFERENCE + THERMAL NOISE) =g+h+i (dBm/Hz) | -163.00 | -163.00 | -163.00 |
| (k1) INFORMATION SPEED (kbps) | 12.20 | 64.00 | 384.00 |
| (k2) INFORMATION SPEED (dBHz) | 40.86 | 48.06 | 55.84 |
| (l) REQUIRED $E_b/(N_0+I_0)$ (∧) (dB) | 6.10 | 3.80 | 2.70 |
| (m) REQUIRED RECEIVING POWER=j+k2+l (dB) | -116.04 | -111.14 | -104.46 |
| (n) DHO GAIN (dB) | 3.00 | 3.00 | 3.00 |
| (o) SHADOWING MARGIN (dB) | 5.30 | 5.30 | 5.30 |
| (p) MARGIN OF HIGH-SPEED TRANSMISSION POWER CONTROL (dB) | 2.00 | 2.00 | 2.00 |
| (q) BUILDING PENETRATION LOSS (dB) | 6.00 | 6.00 | 6.00 |
| (r) ANTENNA BEAM TILT COMPENSATION (dB) | 0.00 | 0.00 | 0.00 |
| (s) ALLOWABLE PROPAGATION LOSS= d+e-f-m+n-o-p-q-s (dB) | 142.74 | 140.84 | 134.16 |
| (t) MAXIMUM REACHABLE RANGE (km) (CALCULATED BY REFERENCE 3, ETC.) | 1.88 | 1.66 | 1.06 |

POWER CALCULATION METHOD OF A RADIO COMMUNICATION SYSTEM AND AN APPARATUS THEREFOR

BACKGROUND OF THE INVENTION

1. Field of the Invention

The present invention generally relates to a radio line design of a mobile communication system, and specifically relates to a power calculation method used by the radio line design employed when defining a service area (cell radius) and a transmission power of a base station of the mobile communication system.

The present invention further relates to an apparatus that can perform the radio line design according to the power calculation method.

2. Description of the Related Art

In a conventional mobile communication system such as a PDC (Personal Digital Cellular) system, a mobile communication service is provided by dividing a service area into a plurality of relatively small zones, called cells. This type of mobile communication system provides mobile communication service, such as voice communication, by establishing radio channels between a plurality of base stations and a plurality of mobile stations.

In such a mobile communication system, radio wave transmitted from a transmitting point, i.e., a base station or a mobile station, reaches a receiving point, i.e., another mobile station or another base station after attenuation through the space. The grater Magnitude of the attenuation becomes, the larger a range between the transmitting point and the receiving point gets. The receiving point requires certain minimum signal strength in order that a signal is restored in predetermined quality, as defined by, for example, a BER (Bit Error Rate) and a BLER (Block Error Rate). Where a transmission power of the transmitting point is a fixed value, there is a limit in the range for a signal to reach the receiving point at a satisfactory strength level. The range can be increased by installing a higher transmission power amplifier, and by improving receiving performance. In addition, employing an antenna of a higher gain, and shortening a cable between a transmitter and the antenna, reducing loss, can extend the range. While these variables determine a maximum service-able range for a given transmission power, how much transmission power is required to attain a given range can also be obtained, making the transmission power a variable. To structure an efficient service area in the mobile communication system using radio lines, it is highly important to obtain an optimum relation between the service-able range and the transmission power.

In this radio line design, in order to examine the relation of the range of a signal and transmitted power, a table such as shown in FIG. 4 is generally used. The table of FIG. 4 is set to an uplink (from a mobile station to a base station) of a CDMA (Code Division Multiple Access) mobile communication system, for example. Each of entries (a) through (t) of this table is inter-related by formulas. If a transmission power, for example, is inputted, a service-able range corresponding to the transmission power is computed. If a desired range, to the contrary, is inputted, a transmission power required to obtain the range will be computed.

Such a table is realizable with various kinds of spreadsheet software that generally operates on a personal computer. The table of FIG. 4 includes a transmission power (a), a transmission antenna feeder loss (b), a transmission antenna gain (c), a receiving antenna gain (e), a receiving antenna feeder loss (f), a building penetration loss (q), and the like, which are taken into consideration as losses and gains of propagation. A required receiving power (m) is a function of a total noise (j), information transmission speed (12.2 kbps (1), 64 kbps (2), 384 kbps (3)) (k2), and required Eb/(N0+I0) (1). Here, the total noise (j) is a sum of a noise figure (NF) of a receiver (g), a thermal noise power density of the receiver (h), and an interference margin (i). In this example, a diversity handover gain (diversity gain by a simultaneous connection with a plurality of base stations) (n) that is characteristic of CDMA mobile communication, a shadowing margin (o) by buildings, and a fluctuating transmission power margin due to high-speed transmission power control (p), etc., are also considered. Here, the interference margin (i) is a margin allowed for interference caused by other users' communications to signal transmission of the receiver concerned in the case of CDMA mobile communication. The interference power is considered in the radio line design in this manner. In this table, properties are given in dB values such that evaluation is realized by adding and subtracting. Generally, this table is called a link budget, and widely used in a radio line design.

As mentioned above, a similar technique to the conventional radio line design, i.e., link budget, is applicable to the radio line design of the uplink circuit in the CDMA mobile communication, by introducing the interference margin representing an amount of the uplink interference that can have big influence on capacity. However, the conventional link budget technique cannot be applied as it is to the downlink of the CDMA mobile communications (called CDMA hereafter) for the following reasons.

In the downlink of CDMA, signals are transmitted from a base station to a plurality of mobile stations in the same radio frequency band. In order to increase receiving signal strength at a mobile station in a cell, an area of the cell can be set small, that is, a smaller radius cell helps providing relatively stronger signal to the mobile stations in the cell. However, for a mobile station that is nearby the base station, and therefore requires a smaller output of the base station, a relatively strong signal to a relatively remote mobile station causes interference. In this manner, making the cell radius smaller does not provide a desirable solution in terms of a ratio of signal strength of a desired signal vs. interference signals. In other words, a total output power transmitted from the base station is a source of the interference against mobile stations.

Further, similar interference is conceivable from other cells, as explained with reference to FIG. 3.

FIG. 3 shows two base stations 200 and 210, each transmitting at an output power level of 100. Each of mobile stations 100 and 110 near boundary of a respective cell is receiving signals from the base stations 200 and 210, respectively, at a receiving signal strength level of 5. In an attempt to increase the receiving signal strength level, suppose that a cell radius is decreased as shown by (b) of FIG. 3. Certainly, the signal strength level of a desired signal received at a mobile station 120 is increased to 20. However, the signal strength level of an undesired signal from a base station 230 is also increased to 20. In terms of the ratio of the desired signal vs. interference, there is no improvement.

As above, there are two important parameters in designing a CDMA downlink circuit, namely, a total output power of a base station and how much of the total output power to be assigned to a design target channel. Studies on this point have been published. For example, reference 1 (Ishikawa, Nakano, Uebayashi, "DS-CDMA Mobile Communication Downlink Radio line Design Method", the Institute of Electronics, Information and Communication Engineers 1997, Society Conference, B-5-8, September, 1997) analyzes in detail how the total power of a base station and the ratio of the power assigned to a design-target channel influence receiving quality, such that an optimum total power and an optimum ratio are obtained. Reference 2 (Hayashi, Usuda, Ishikawa, Nakamura, Onoe, "Study on Power Ratio to a common control channel in a downlink of W-CDMA", the Institute of Electronics, Information and Communication Engineers 2000, General Conference, B-5-81, March, 2000) provides a detailed report on how distribution ratio of the power influences a BER of a channel.

As described, the CDMA downlink circuit has a complicated property that receiving signal strength of not only a desired signal, but also interference of other station, significantly varies with a cell radius and various losses. For this reason, design of a downlink circuit has been performed by computer simulation, etc., that is, the conventional link budget technique, in which calculations are based on adding and subtracting a gain and a loss, cannot be applied as it is.

SUMMARY OF THE INVENTION

Accordingly, it is one object of the present invention to provide a power calculation method applicable to a downlink of a CDMA mobile communication system, and an apparatus therefor that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a power calculation method wherein a total power level and a power level assigned to a channel are considered, either independently or as a ratio of the two power levels. A factor of a non-orthogonal component, and interference from other base stations are also considered in the calculation such that an accurate result is obtained. The present invention also provides a power calculation apparatus that can be realized by a personal computer or a workstation by using spreadsheet software.

BRIEF DESCRIPTION OF THE DRAWINGS

FIG. 2 is a figure showing an embodiment of this invention concerning a link budget of a downlink of a CDMA mobile communication system;

FIG. 3 is a figure showing interference from another cell in a downlink circuit of the CDMA mobile communication system; and FIG. 4 is a figure showing an example of the link budget of an uplink circuit of the CDMA mobile communication system.

DESCRIPTION OF THE PREFERRED EMBODIMENTS

Figure 1:
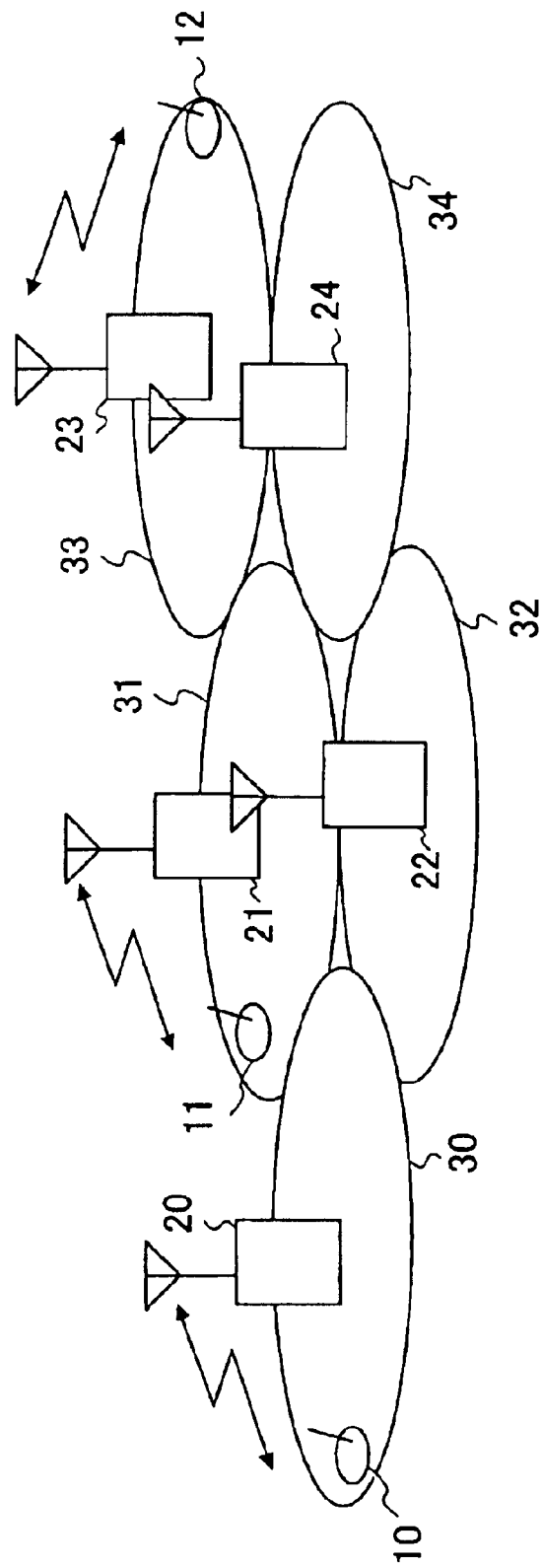
FIG. 1 is a figure showing a structure of a mobile communication to which an embodiment of a power calculation method of this invention is applied.

In the following, embodiments of the present invention will be described with reference to the accompanying drawings.

FIG. 1 is a figure showing a structure of a mobile communication system to which a power calculation method of an embodiment of the present invention is applied. This mobile communication system employs, e.g., CDMA as a radio access method. Service is provided by dividing a service area into relatively small radio zones, which are also called cells 30–34. In the case of the CDMA mobile communication system, a carrier of the same frequency is used in all the cells 30–34. The CDMA mobile communication system includes two or more transmitting stations (henceforth base stations) 20, 21, 22, 23, and 24, each of which covering one of the divided radio zones, and receiving stations (henceforth mobile stations) 10, 11, and 12 that communicate with the base stations 20, 21, and 23, respectively, by setting up a radio channel.

FIG. 2 shows an embodiment of the present invention of a link budget of a downlink circuit of the CDMA mobile communication system.

The link budget shown in FIG. 2 is an example of a link budget of a common control channel (CCPCH: Common Control Physical CHannel) of a downlink circuit of the CDMA mobile communication system. Each of entries (a) through (y) is provided with a value input by a designer or a resulting value of a calculation using other values. According to the present invention, a required receiving power R of one of the mobile stations 10, 11, and 12 (the mobile station 10 is hereafter represented) is calculated by one of formulas as follows.

$$R = R_0 \frac{1}{1 - \frac{\Lambda}{pg} \cdot \frac{P_{total}}{P} \cdot (\gamma + F)} \quad \text{[Formula 1]}$$

-continued $$R = R_0 \frac{1}{1 - \frac{\Lambda}{pg} \cdot \frac{\gamma + F}{\xi}} \quad \text{[Formula 2]}$$

That is, the required receiving power R is obtained according to (r) of FIG. 2.

$$R = \frac{10^{(p)/10} \cdot 10^{(m)/10}}{1 - \frac{(k) \cdot 10^3 \cdot 10^{(p)/10}}{(n) \cdot 10^6 \cdot (b1)/100} \cdot ((q) + 10^{(o)/10})} \quad \text{[Formula 3]}$$

In this formula of calculating the required receiving power (r), the numerator represents a receiving power where there is no interference, and is equivalent to $R_0$ of the formula (1) and the formula (2), and the denominator serves as a compensation term to the receiving power $R_0$. In the denominator, $(k) \times 10^3/(n) \times 10^6$ is equivalent to a spread coefficient pg. Further, a constant expressing reduction of interference in a cell in which the receiver is present (orthogonality factor) γ, which is equivalent to (q) in the formula (3), is a parameter indicating that the interference in the cell is reduced by downlink orthogonalization. The orthogonality factor γ (0<=γ=<1) takes zero where perfect orthogonality is in place, generating no interference in the cell, and takes 1 where no orthogonality is present. Further, γ=1 will be set up where this γ constant is not used. A coefficient F indicates interference from other cells, and is equivalent to (o) in the formula (3), which is a parameter indicating magnitude of interference from other base stations as compared with a power from the cell, as measured at a boundary of the cell. Where the interference from other cells is not taken into consideration, F=0 is set up.

Next, an example of calculation of the required receiving power R is shown below.

Parameter values necessary for the calculation of the required receiving power R in the formula (3) are set as follows, for example.

(k) Symbol speed: 15.00 [ksps]

(n) Chip rate: 3.84 [Mcps]

(o) Coefficient of interference from other cells F:8.00 [dB]

(p) Required ratio of desired signal vs. interference Λ:7.00 [dB]

(q) Orthogonality coefficient γ:0.50.

Applying the above parameters to the formula (3), the required receiving power R is obtained as R=−116.95[dBm]. Here, a propagation loss can be converted to a range, according to various theories, empirical formulas, etc. For example, an empirical formula of radio wave propagation given by reference 3 (M. Hata, "Empirical Formula for Propagation Loss in Land Mobile Radio Services" IEEE Trans. Vehic. Technol., vol. VT-29, no. 3, pp. 317–325, August 1980) can be used. (In this example, the range (y) obtained according to the above-mentioned reference 3 is 4.12 [km]).

The link budget of a downlink circuit of the CDMA mobile communication system shown in FIG. 2 is an embodiment example of a link budget of CCPCH of this invention, and does not limit the embodiment of the present invention. Although the required receiving power when there is no interference was calculated in this example, based on a property of a receiver, such as the thermal-noise power (m) of the receiver, and required SIR (Signal to Interference Ratio that is a ratio of desired signal power to noise power) value Λ (p), the values may be determined by a computer simulation or by experiments with actual receivers. Moreover, although this embodiment employs items peculiar to mobile communications, such as the shadowing margin and building entry loss, these items are not essential to this invention. That is, so long that a required receiving power is calculated according to the total power of the base station 20, and the power of a predetermined radio channel, and, as required, the orthogonality coefficient and the interference coefficient relative to other cells, it is possible to acquire the same effect.

As mentioned above, the CDMA downlink circuit, that is, from the base station 20 to a mobile station 10, has unique characteristics. Such unique characteristics includes that a plurality of mobile stations receive signals transmitted from the base station 20 collectively in the same frequency band in different places, which causes interference amount significantly to differ from place to place. Further, the unique characteristics includes that an orthogonal coding is employed, a common control channel that transmits advisory information and paging information is present, and a common pilot channel method is applied. The power calculation method of this invention realizes a calculation of the required receiving power in a downlink circuit of the CDMA system having above characteristics, using the total power of the base station 20 and the transmitted power of a given radio channel, and, as required, the orthogonalization coefficient and the interference coefficient relative to other cells. Based on the calculated required receiving power, the range (cell radius) can be obtained easily. That is, the link budget technique is now applicable to designing a downlink circuit of the CDMA mobile communication system, which has been difficult so far. Thus, the link budget technique of the present invention provides, among other things, a required transmission power value of a base station, especially that of the common control channel (CCPCH) easily and with high precision.

A power calculation apparatus according to the power calculation method of this invention can be realized by a personal computer or a workstation. Spreadsheet software is introduced to the personal computer or the workstation, and the formula (3) is placed in a box of the table of the link budget shown in FIG. 2, corresponding to the required receiving power (r). In this manner, the required receiving power (r) is obtained easily.

In this example, the spreadsheet function introduced into the personal computer or the workstation represents power calculation means.

As mentioned above, the link budget technique is now available to calculating the required receiving power of a given radio channel in the downlink circuit of a CDMA mobile communication system. The present invention realizes the link budget for the CDMA downlink by considering both the transmitted power of the given radio channel and the total transmission power. In addition, a higher precision result can be obtained by further considering a degree of orthogonality and magnitude of interference from other cells.

The present invention further provides the power calculation apparatus that performs the power calculation according to the above power calculation methods.

Further, the present invention is not limited to these embodiments, but various variations and modifications may be made without departing from the scope of the present invention.

The present application is based on Japanese priority application No. 2001-064140 filed on Mar. 7, 2001 with the Japanese Patent Office, the entire contents of which are hereby incorporated by reference.

What is claimed is:

1. In a code division multiple access radio communication system, a power calculation method for calculating a power of a radio wave in a radio channel included in a radio line established between a transmitting station and a receiving station in the system, comprising the step of:

calculating the power of the radio wave of the radio channel, using a transmission power of the radio channel and a total transmission power including the transmission power of the radio channel, wherein a required receiving power R in the radio channel is calculated by an equation represented by a required receiving power $R_0$ when interference does not exist at all at a receiver, and a ratio $P_{total}/P$ of the total power $P_{total}$ the transmitting station and the transmission power P of the predetermined radio channel transmitted from the transmitting station.

2. A power calculation method as claimed in claim 1, wherein the required receiving power R in the radio channel is calculated by a following formula:

$$R = R_0 \frac{1}{1 - \frac{\Lambda}{pg} \cdot \frac{P_{total}}{P}}$$

herein, $\Lambda$ is a signal to noise (interference is included) power ratio required at a receiver, and pg is a spread gain.

3. In a code division multiple access radio communication system, a power calculation method for calculating a power of a radio wave in a radio channel included in a radio line established between a transmitting station and a receiving station in the system, comprising the step of:

calculating the power of the radio wave of the radio channel, using a transmission power of the radio channel and a total transmission power including the transmission power of the radio channel, wherein a following formula is used to calculate a required receiving power R at a receiver, $$R = R_0 \frac{1}{1 - \frac{\Lambda}{pg} \cdot \frac{1}{\xi}}$$

herein, $R_0$ is a required receiving power when interference does not exist at all at the receiver, $\Lambda$ is a signal to noise (interference is included) power ratio needed by the receiver, pg is a spread gain, and $\xi$ is a ratio of the transmission power of the predetermined radio channel transmitted from the transmitting station to the total transmission power.

4. In a code division multiple access radio communication system, a power calculation method for calculating a power of a radio wave in a radio channel included in a radio line established between a transmitting station and a receiving station in the system, comprising the step of:

calculating the power of the radio wave of the radio channel, using a transmission power of the radio channel and a total transmission power including the transmission power of the radio channel, wherein a required receiving power R is calculated by one of following formulas:

$$R = R_0 \frac{1}{1 - \frac{\Lambda}{pg} \cdot \frac{P_{total}}{P} \cdot \gamma}$$

or $$R = R_0 \frac{1}{1 - \frac{\Lambda}{pg} \cdot \frac{\gamma}{\xi}}$$

herein, $R_0$ is a required receiving power when interference does not exist at all at the receiving station, $\Lambda$ is a signal to noise (interference is included) power ratio required by the receiving station, pg is a spread gain, P is the transmission power of the predetermined radio channel transmitted from the transmitting station, $P_{total}$ is the total transmission power from the transmitting station, $\xi$ is a ratio of the transmission power of the predetermined radio channel transmitted from the transmitting station to the total transmission power, and $\gamma$ is a coefficient multiplied to interference from the transmitting station in communication with the receiving station.

5. A power calculation method as claimed in claim 4, wherein the required receiving power of the radio channel is calculated according to one of following formulas:

$$R = R_0 \frac{1}{1 - \frac{\Lambda}{pg} \cdot \frac{P_{total}}{P} \cdot (\gamma + F)}$$

or $$R = R_0 \frac{1}{1 - \frac{\Lambda}{pg} \cdot \frac{\gamma + F}{\xi}}$$

herein, $R_0$ is a required receiving power when interference does not exist at all at the receiving station, $\Lambda$ is a signal to noise (interference is included) power ratio required at the receiving station, pg is a spread gain, P is the transmission power of the predetermined radio channel transmitted from the transmitting station, $P_{total}$ is the total transmission power from the transmitting station, ξ is a ratio of the transmission power of the predetermined radio channel transmitted from the transmitting station to the total transmission power, γ is a coefficient multiplied to interference from the transmitting station in communication with the receiving station, and F is a power ratio of a total interference from transmitting stations other than the transmitting station in communication with the receiving station, and an interference from the transmitting station in communication with the receiving station.

6. In a code division multiple access radio communication system, a power calculation method for calculating a power of a radio wave in a radio channel included in a radio line established between a transmitting station and a receiving station in the system, comprising the step of:

calculating the power of the radio wave of the radio channel, using a transmission power of the radio channel and a total transmission power including the transmission power of the radio channel, wherein a required receiving power R is calculated according to one of following formulas:

$$R = R_0 \frac{1}{1 - \frac{\Lambda}{pg} \cdot \frac{P_{total}}{P} \cdot (1+F)}$$

or $$R = R_0 \frac{1}{1 - \frac{\Lambda}{pg} \cdot \frac{1+F}{\xi}}$$

herein, $R_0$ is a required receiving power when interference does not exist at all at the receiving station, Λ is a signal to noise (interference is included) power ratio required at the receiving station, pg is a spread gain, P is the transmission power of the predetermined radio channel transmitted from the transmitting station, $P_{total}$ is the total transmission power from the transmitting station, ξ is a ratio of the transmission power of the predetermined radio channel transmitted from the transmitting station to the total transmission power, and F is a power ratio of a total interference from transmitting stations other than the transmitting station in communication with the receiving station, and an interference from the transmitting station in communication with the receiving station.

7. In a code division multiple access radio communication system, a power calculation apparatus for calculating a power of a radio wave in a radio channel included in a radio line established between a transmitting station and a receiving station in the system, comprising:

power calculation means that calculates the power of the radio wave of the radio channel, using a transmission power of the radio channel and a total transmission power including the transmission power of the radio channels, wherein a required receiving power R in the radio channel is calculated by an equation represented by a required receiving power $R_0$ when interference does not exist at all at a receiver, and a ratio $P_{total}/P$, of the total power $P_{total}$ transmitted from the transmitting station and the transmission power P of the predetermined radio channel transmitted from the transmitting station.

8. A power calculation apparatus as claimed in claim 7, wherein the power calculation means calculates the required receiving power R in the radio channel by a following formula:

$$R = R_0 \frac{1}{1 - \frac{\Lambda}{pg} \cdot \frac{P_{total}}{P}}$$

herein,

Λ is a signal to noise (interference is included) power ratio required at the receiver, and pg is a spread gain.

9. In a code division multiple access radio communication system, a power calculation apparatus for calculating a power of a radio wave in a radio channel included in a radio line established between a transmitting station and a receiving station in the system, comprising:

power calculation means that calculates the power of the radio wave of the radio channel, using a transmission power of the radio channel and a total transmission power including the transmission power of the radio channel, wherein the power calculation means uses a following formula to calculate a required receiving power R at a receiver, $$R = R_0 \frac{1}{1 - \frac{\Lambda}{pg} \cdot \frac{1}{\xi}}$$

herein, $R_0$ is a required receiving power when interference does not exist at all at the receiver, Λ is a signal to noise (interference is included) power ratio needed by the receiver, pg is a spread gain, and ξ is a ratio of the transmission power of the predetermined radio channel transmitted from the transmitting station to the total transmission power.

10. In a code division multiple access radio communication system, a power calculation apparatus for calculating a power of a radio wave in a radio channel included in a radio line established between a transmitting station and a receiving station in the system, comprising:

power calculation means that calculates the power of the radio wave of the radio channel, using a transmission power of the radio channel and a total transmission power including the transmission power of the radio channel, wherein a power calculation means calculates a required receiving power R by one of following formulas;

$$R = R_0 \frac{1}{1 - \frac{\Lambda}{pg} \cdot \frac{P_{total}}{P} \cdot \gamma}$$

or

-continued $$R = R_0 \frac{1}{1 - \frac{\Lambda}{pg} \cdot \frac{\gamma}{\xi}}$$

herein, $R_0$ is a required receiving power when interference does not exist at all at the receiving station, $\Lambda$ is a signal to noise (interference is included) power ratio required by the receiving station, pg is a spread gain, P is the transmission power of the predetermined radio channel transmitted from the transmitting station, $P_{total}$ is the total transmission power from the transmitting station, $\xi$ is a ratio of the transmission power of the predetermined radio channel transmitted from the transmitting station to the total transmission power, and $\gamma$ is a coefficient multiplied to interference from the transmitting station in communication with the receiving station.

11. A power calculation apparatus as claimed in claim 10, wherein the power calculation means calculates the required receiving power of the radio channel according to one of following formulas:

$$R = R_0 \frac{1}{1 - \frac{\Lambda}{pg} \cdot \frac{P_{total}}{P} \cdot (\gamma + F)}$$

or $$R = R_0 \frac{1}{1 - \frac{\Lambda}{pg} \cdot \frac{\gamma + F}{\xi}}$$

herein, $R_0$ is a required receiving power when interference does not exist at all at the receiving station, $\Lambda$ is a signal to noise (interference is included) power ratio required at the receiving station, pg is a spread gain, P is the transmission power of the predetermined radio channel transmitted from the transmitting station, $P_{total}$ is the total transmission power from the transmitting station, $\xi$ is a ratio of the transmission power of the predetermined radio channel transmitted from the transmitting station to the total transmission power, $\gamma$ is a coefficient multiplied to interference from the transmitting station in communication with the receiving station, and F is a power ratio of a total interference from transmitting stations other than the transmitting station in communication with the receiving station, and an interference from the transmitting station in communication with the receiving station.

12. In a code division multiple access radio communication system, a power calculation apparatus for calculating a power of a radio wave in a radio channel included in a radio line established between a transmitting station and a receiving station in the system, comprising:

power calculation means that calculates the power of the radio wave of the radio channel, using a transmission power of the radio channel and a total transmission power including the transmission power of the radio channel, wherein the power calculation means calculates a required receiving power R according to one of following formulas:

$$R = R_0 \frac{1}{1 - \frac{\Lambda}{pg} \cdot \frac{P_{total}}{P} \cdot (1 + F)}$$

or $$R = R_0 \frac{1}{1 - \frac{\Lambda}{pg} \cdot \frac{1 + F}{\xi}}$$

herein, $R_0$ is a required receiving power when interference does not exist at all at the receiving station, $\Lambda$ is a signal to noise (interference is included) power ratio required at the receiving station, pg is a spread gain, P is the transmission power of the predetermined radio channel transmitted from the transmitting station, $P_{total}$ is the total transmission power from the transmitting station, $\xi$ is a ratio of the transmission power of the predetermined radio channel transmitted from the transmitting station to the total transmission power, and F is a power ratio of a total interference from transmitting stations other than the transmitting station in communication with the receiving station, and an interference from the transmitting station in communication with the receiving station.

* * * * *